United States Patent [19]
Lupinski

[11] 4,201,837
[45] May 6, 1980

[54] BONDED AMORPHOUS METAL ELECTROMAGNETIC COMPONENTS

[75] Inventor: John H. Lupinski, Scotia, N.Y.

[73] Assignee: General Electric Company, Schenectady, N.Y.

[21] Appl. No.: 961,261

[22] Filed: Nov. 16, 1978

[51] Int. Cl.[2] .......................... G11B 5/16; H01F 3/04; B32B 15/08

[52] U.S. Cl. .................................... 428/457; 156/272; 156/311; 148/31.55; 252/62.55; 335/297; 360/126; 428/473.5; 428/538; 428/635; 428/900

[58] Field of Search ............... 428/635, 900, 457, 538, 428/336, 337, 473.5; 252/62.55, 62.51 R; 335/297, 296; 360/126; 148/31.55, 31.57; 156/272, 311

[56] References Cited

U.S. PATENT DOCUMENTS

| | | | |
|---|---|---|---|
| 1,586,884 | 6/1926 | Elmen | 156/311 X |
| 2,990,277 | 6/1961 | Post et al. | 148/31.55 X |
| 2,992,474 | 7/1961 | Adams et al. | 360/126 X |
| 3,365,709 | 1/1968 | Gooch | 360/126 |
| 3,387,995 | 6/1968 | Senkpiel et al. | 428/900 X |
| 3,403,996 | 10/1968 | Hirota et al. | 148/31.55 X |
| 3,711,365 | 1/1973 | Pyle | 156/272 X |
| 3,843,420 | 10/1974 | Gittleman et al. | 148/31.55 |
| 3,850,706 | 11/1974 | Street | 148/31.55 |
| 3,856,513 | 12/1974 | Chen et al. | 75/122 |
| 3,894,306 | 7/1975 | Sischka | 428/473.5 |
| 4,079,430 | 3/1978 | Fujishima et al. | 360/126 |

OTHER PUBLICATIONS

Metashield Fabric for Magnetic Shielding, Allied Chemical Metaglass Products, 8 pages.

*Primary Examiner*—Harold Ansher
*Attorney, Agent, or Firm*—Leo I. MaLossi; James C. Davis, Jr.

[57] ABSTRACT

Magnetic cores suitable for use in transformers, generators and motors are provided. The core is formed of a laminate of layers of substantially amorphous metal laminae compressed to a rigid composite.

5 Claims, No Drawings

BONDED AMORPHOUS METAL ELECTROMAGNETIC COMPONENTS

BACKGROUND OF THE INVENTION

This invention relates to the manufacture of electromagnetic components from amorphous metal ribbons by compressing and bonding said ribbons.

Electrical steel forms the magnetic core of almost all transformers, generators and motors. The machines in which they are employed are usually large and heavy, so that the cost per pound of magnetic material is important. Accordingly, their cores are made of electrical steel because it is the cheapest magnetic material, albeit far from the most effective. For example, the resistivity for grain-oriented silicon steel of 12–15 mil gauge is ~50, and ~15 for low carbon steel as opposed to ~150μ Ωcm for amorphous magnetic alloys.

Cores are subjected to alternating and/or rotating magnetic fields and because the machine in which they are employed handle large amounts of electric power, the minimization of the energy loss per cycle is quite important. The losses are primarily due to eddy currents. Eddy currents are objectionable, not only because they decrease the flux, but also because they produce heat. These currents which oppose the main field can be decreased by forming the core of thin sheets rather than from a solid piece. If the sheets are electrically insulated from one another, the eddy currents are forced to circulate within each lamination. Not only is the path length in each lamination now shorter but the cross-sectional area of the path is also reduced. The induced emf is therefore reduced and the net effect is a decrease in the current and in the eddy-current power loss. For these reasons, laminated construction is standard for all cores of transformers, motors or generators made from metallic conducting materials.

In order to minimize the cost of construction, the laminations are usually thicker than would be desired to minimize eddy current loss. For example, the most popular lamination thickness is about 0.012 inch, whereas for many applications laminations of 1–2 mils would be desirable. Due to the cost of forming thin sheets of electric steel and the concomitant difficulty and the cost of forming the resultant core, it would be desirable if cores could be made from new materials which have fabrication costs of thick laminations but the magnetic and electrical properties of thin laminations. It is the provision of such magnetic components to which this invention is directed.

Amorphous magnetic metals, unlike normal crystalline magnetic metals, have no long range atomic order in their structure. Therefore, the directionality of properties such as magnetization normally associated with crystal anisotropy is absent. Also, unlike normal metals, amorphous metals are extremely homogeneous, being devoid of inclusions and structural defects. These two characteristics—magnetic isotropy and structural homogeneity—give amorphous metals unusually good d-c magnetic properties. The magnetic isotropy leads to extremely low field requirements for saturation, and the structural homogeneity allows the magnetization to reverse with extremely low fields (i.e., a low coercive force). These two features combined with the high resistivity (15 times that of common iron) and lamination thinness provide a material with the lowest a-c losses of any known high magnetic saturation material.

Amorphous structures can be obtained by several techniques. Electroplating, vapor deposition, and sputtering are all techniques where the material is deposited on an atom by atom basis. Under specific conditions, the atoms are frozen in place on contact and do not have a chance to move to the lower energy positions of the normal crystal lattice sites. The resulting structure is an amorphous, non-crystalline glassy one. These methods, however, are not economical for producing large commercial quantities.

The other method for producing amorphous structures in metals is by cooling rapidly from the liquid melt. Two conditions must be met to achieve the amorphous structure by this method. First, the composition must be selected to have a high glass transition temperature, $T_g$, and a low melting temperature, $T_m$. Specifically, the $T_g/T_m$ ratio should be as large as possible. Second, the liquid must be cooled as rapidly as possible from above $T_m$ to below the $T_g$. In practice, it is found that to produce metallic glasses, the cooling rate must be of the order of a million degrees centigrade per second. Even at these high rates, only special compositions can be made amorphous. Typically, "glass forming" atoms such as the metalloids, phosphorus, boron, silicon, and carbon are required additions to the metal alloy, usually in the 10 to 25 atomic percent range.

In machines, such as motors and transformers, there are design requirements on the geometry of the magnetic material. These requirements depend on the properties of the material and the physical structure of the device. Ideally, the material should be continuous along the flux path to form a completely closed magnetic circuit. This would provide the highest permeability possible for the circuit and the lowest excitation current requirements. This geometry is not possible with normal laminated electrical steel because the assembly requirements necessitate cutting the magnetic material. For example, in transformers the negative effect on the permeability from this cutting is partially eliminated by making a complex interleaved joint; while in motors a substantial air gap remains in the magnetic circuit at the interface between the rotor and stator. Another special geometric requirement on an a-c machine is that the magnetic material be thin in a plane parallel to the flux direction. This is essential to minimize the eddy current losses. However, with decreasing lamination thickness, more laminations are needed so the punching time and assembly costs increase.

DESCRIPTION OF THE INVENTION

In accordance with the invention, an electromagnetic component is formed from a plurality of regularly spaced and aligned thin planar substantially rectangular amorphous metal ribbons positioned such that there are substantially no gaps between metal ribbons. "Substantially no gaps" means that laminae are arranged alternately whereby there is at least partial overlapping between adjacent layers or the laminae are interwoven or otherwise positioned such that there are none, i.e. the laminate is airtight and impervious to light, or contains fewer than about 20 holes per 100 sq. inches with a hole diameter of less than about 1/32". The ribbons can be formed into laminates by conventional means and punched or stamped into the desired shape for use in motors, transformers and other inductive components.

To form the ribbons, a stream of liquid alloy melt is delivered against a relatively rapidly moving cylindrical chill roll or other chilled surface having high thermal conductivity material, such as copper, copper alloys, steel, stainless steel, or the like. The liquid alloy is quenched and solidified and moves away from the chill cylinder to continuously form a ribbon or sheet of solidified metal. A method for forming the ribbon is disclosed and claimed in copending application Ser. No. 896,752, filed Apr. 17, 1978 in the name of Howard H. Liebermann and assigned to the assignee of this application, now U.S. Pat. No. 4,144,926 which is herein incorporated by reference.

The amorphous metal ribbon being processed can be any of the magnetic metals. Typical materials are represented by the formula, $$A_xZ_y,$$

wherein A is one or more of Fe, Co, Ni, Mo, W, Cr and V, Z is one or more of Si, C, B, P, Al, Sn, Sb, Ge, In, and Be, x is an atomic percentage of from 70 to 90, and y is an atomic percentage of from 30 to 10. Typical materials are disclosed in U.S. Pat. No. 3,856,513 to Chen et al. which is herein incorporated by reference.

The metal ribbons for soft magnetic properties should be at least 50 percent amorphous and preferably 90 percent or more. In order to maximize the magnetic properties, the percent by volume of magnetic material in the composite should be between about 50 percent and about 95 percent, and preferably between about 85 percent and about 95 percent. The length of the ribbons is generally at least 1 inch and preferably between about 3 inches and about 12 inches or the length of the part to be formed. The width of the ribbons is generally at least 0.5 inch and preferably at least 1 inch or the width of the article to be formed. The individual laminae are generally between about 0.0005" and 0.002" thick and the laminate at least about 4 laminae deep. Preferably, however, the laminate is greater than about 0.01" thick for best results and there is no upper limit on the thickness.

To obtain the best magnetic properties in the component or composite, the ribbons are aligned with their long axis parallel to the lines of force, in contact with one another along the axis and laying in the same plane. In some applications, however, it may be desirable to interweave the ribbon or provide laminae of ribbons whose long axis is parallel to the lines of force separated by alternate laminae of staggered ribbons of from about b 1° to 90°. The ribbons can be combined with or without a binder, but preferably a binder is employed in some applications as it may improve the a-c electrical properties.

When a binder is employed, the amorphous ribbons can be coated by conventional means such as dipping, spraying and the like with a suitable binder, the ribbons assembled into the desired configuration and compressed at elevated temperature and pressure until the binder softens or reacts to contain the ribbons in the compressed state.

If a binder is employed, generally from about 1 percent to about 10 percent by volume of initial constituents is sufficient and preferably from between about 1 percent and about 5 percent with a thickness less than about 0.1 mil. The pressing force will depend upon the materials and uses and the like, but generally is between about 1,000 psi and about 30,000 psi at a temperature between about 30° C. and the decomposition temperature of the resin and the recrystallization temperature of the metal.

For best results, the ribbons will be annealed either before, during or after compacting, but for best results after compacting. When a binder is employed it must be able to withstand the annealing conditions. Depending upon the processing and annealing conditions and the desired end use, organic binders can be employed, such as the epoxys, polyamideimides, polyamides, polyimides, cyanoacrylates and phenolics. The binder should be electrically insulating, cure rapidly and be able to meet the thermal requirements of the intended application and annealing if required. In some applications there are further requirements, such as being compatible with commercial refrigerants when used for air conditioning compressor motors.

The following examples will serve to illustrate the invention and preferred embodiments thereof. All parts and percentages in said examples and elsewhere in the specification and claims are by weight unless otherwise specified.

EXAMPLES

Metglas Alloy 2826MB ribbons ½ inch wide and 1.7 mils thick (manufactured by Allied Chemical Co. and having the nominal composition $Fe_{40}Ni_{38}Mo_4B_{18}$) were coated with a 0.2 mil film by passing through a solution of GE AI-600 polyamideimide in N-methyl pyrrolidone/hydrocarbon solvent at 7.8% solids and dried by passing through a 12' long vertical furnace at a rate of approximately 3 feet per minute with a temperature profile between 130° at the bottom and 240° C. at the top. The resultant strips were placed 6 layers deep in alternating layers at 90° in a nonmagnetic die cavity of stainless steel lined with Teflon-coated aluminum. The strips were easily aligned by means of permanent magnets placed under the die. The composite was pressed at 2000 psi and 330° C. for two minutes after allowing the die to preheat at 330° C. for a few minutes without pressure to equilibrate and drive out excess air and water from the die and ribbons. The composite is then tested in a d-c hysterigraph and found to have a coercive force of less than 0.01 Oe after annealing at 325° C. for two hours indicating low hysteresis losses and useful for application in transformers and motors.

The procedure is repeated with similar results employing Metglas 2826MB one inch wide strips.

In another experiment the amorphous metal is coated with a dilute solution (approximately 10% solids) of Pyre ML polyimide precursor (manufactured by the duPont Co.) followed by passage through the vertical furnace with a temperature profile between 220° C. and 300° C. A rigid composite—free of gaps—is then formed by bonding the aligned strip layers for about 3 min. at 3000 psi and 350° C.

The above general coating procedure is repeated with a furnace temperature profile between 75° and 100° C. employing Butvar 74 (a polyvinyl butyral resin manufactured by Monsanto) in ethanol solution at 10 percent solids. The coated ribbons were bonded at a temperature of 125° C. and pressure of 1,000 psi for ~3 minutes resulting in rigid composites of laminates with laminae four deep and adhesive coats of 0.0002 inch between ribbons.

An interwoven composite is formed from Metglas 2826MB ribbons and impregnated with a solution of Nylon 6 in cresol at 10 percent solids. After air drying for about 15 hours at room temperature and at 200° C. for two hours a rigid composite is formed from a laminate with laminae four deep by pressing at 220° C. and 1,000 psi for 2 minutes.

Other cores useful as transformers and stators are prepared employing various amorphous metals and binders with the best electrical properties achieved for composites formed of substantially all amorphous metals.

While the invention has been particularly shown and described with reference to several embodiments of the invention, it will be understood by those skilled in the art that other changes in form and detail can be made therein without departing from the spirit and scope of the invention.

What I claim as new and desire to secure by Letters Patent of the United States is:

1. A method for preparing a laminate composite for a magnetic core useful in a transformer or stator comprising the steps of assembling a plurality of thin polymer-coated metal ribbons of a magnetic metal in an applied magnetic field, said magnetic metal being at least 50 percent amorphous and having the composition represented by the formula, $$A_xZ_y,$$

wherein A is one or more of Fe, Co, Ni, Mo, W, Cr, and V, Z is one or more of Si, C, B, P, Al, Sn, Sb, Ge, In, and Be, x is an atomic percentage of from 70–90, and y is an atomic percentage of from 30–10, said polymer-coated ribbons being disposed in a plurality of layers, each of said layers being composed of a plurality of said polymer-coated ribbons arranged with at least one edge of each polymer-coated ribbon contiguous with an edge of another polymer-coated ribbon and said layers being disposed relative to each other so that abutting edges in contiguous layers are covered by solid magnetic metal, simultaneously subjecting the polymer-coated ribbons so assembled to pressurization in excess of about 1000 psi and to heating to a temperature in excess of the annealing temperature and below the recrystallization temperature of said magnetic metal, and converting the annealed assembly of ribbons as required to convert said assembly into a shaped laminate suitable for construction of said magnetic core.

2. The method of claim 1 wherein the polymer present in the laminate composite is present in an amount by volume of between about 0.1 percent and about 10 percent.

3. The method of claim 1 wherein the magnetic metal is at least 90 percent amorphous.

4. The method of claim 1 wherein

A is Fe and Z is B and Si.

5. The laminate composite produced by the method of claim 1.

* * * * *